(12) United States Patent  
Cabrera et al.

(10) Patent No.: US 7,530,790 B2
(45) Date of Patent: May 12, 2009

(54) ROTOR BLADE FOLDING SYSTEM

(75) Inventors: Pedro L. Cabrera, West Haven, CT (US); David N. Schmaling, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 287 days.

(21) Appl. No.: 11/524,020

(22) Filed: Sep. 20, 2006

(65) Prior Publication Data

US 2009/0097973 A1    Apr. 16, 2009

(51) Int. Cl.
B64C 11/12    (2006.01)

(52) U.S. Cl. .................... 416/134 A; 416/142

(58) Field of Classification Search ............ 416/134 A, 416/142, 143, 141
See application file for complete search history.

(56) References Cited

U.S. PATENT DOCUMENTS

| | | |
|---|---|---|
| 3,153,455 A | 10/1964 | Mosinskis |
| 3,749,515 A | 7/1973 | Covington |
| 4,252,504 A | 2/1981 | Covington |
| 4,284,387 A | 8/1981 | Ferris |
| 4,389,161 A | 6/1983 | Brumen |
| 4,436,483 A | 3/1984 | Watson |
| 4,444,544 A | 4/1984 | Rowley |
| 4,566,857 A | 1/1986 | Brumen |
| 4,712,978 A | 12/1987 | Tiemann |
| 5,151,013 A | 9/1992 | Moore |
| 5,211,538 A | 5/1993 | Seghal |
| 5,249,926 A | 10/1993 | D'Anna |
| 5,322,415 A * | 6/1994 | White et al. ............. 416/143 |
| 5,372,478 A * | 12/1994 | McCafferty ............. 416/106 |
| 5,951,252 A | 9/1999 | Muylaert |
| 6,036,442 A | 3/2000 | Certain |
| 6,170,779 B1 | 1/2001 | Nyhus |
| 6,213,712 B1 | 4/2001 | Muylaert |
| 6,695,253 B1 | 2/2004 | Romani |

* cited by examiner

Primary Examiner—Edward Look
Assistant Examiner—Dwayne J White
(74) Attorney, Agent, or Firm—Carlson, Gaskey & Olds PC (57) ABSTRACT

A rotor blade folding system includes a bearing housing which supports a bearing and rotor blade spindle which folds relative the rotor hub assembly about a fold axis. The rotor blade folding system essentially collapses the rotor hub to facilitate compatibility with a fairing system. By rotating the entire pitch bearing assembly, pitch lock systems are also minimized as the pitch lock system need only react a blade-feathering moment.

22 Claims, 10 Drawing Sheets

ROTOR BLADE FOLDING SYSTEM

BACKGROUND OF THE INVENTION

The present invention relates to a blade fold system for a rotary-wing aircraft, and more particularly to a bearing housing mounted rotor blade bearing assembly which folds relative a rotor hub assembly to minimize pitch lock system requirements.

While the flight capabilities of rotary-wing aircraft makes them effective for a wide variety of missions, operation of rotary-wing aircraft in certain environments may be limited by the overall structural envelopes thereof. The radial dimensions of rotary-wing aircraft main rotor assemblies results in rotary-wing aircraft having relatively large structural envelopes which may impact their utility in some environments.

Rotary-wing aircraft, particularly military rotary-wing aircraft utilized for maritime flight operations, may be required to conduct operations from ships for extended periods of time. Shipboard space is generally at a premium, and the structural envelopes of rotary-wing aircraft may require a relatively significant allocation of such limited space. Furthermore, strategic and tactical considerations in the military utilization of rotary-wing aircraft has led to a requirement for rotary-wing aircraft having main rotor assemblies that may be readily reconfigured for rapid deployment, routine transport, and/or stowage through reduction in structural envelope.

Several options are available to reduce the structural envelope of rotary-wing aircraft to facilitate rapid deployment, routine transport, stowage, and reduce the vulnerability thereof to environmental conditions. One option is to design the main rotor assemblies thereof so that the main rotor blades fold relative the main rotor hub assembly. Typical folding systems include a blade spindle attached to a rotor hub assembly and a fold hinge assembly attached to the blade spindle in series (spindle-to-hub and spindle-to-hinge).

Blade fold systems may be a challenge because the blade retention/pitch bearing needs to be isolated from the moments generated by the blade when in the folded position. Various blade fold systems include a pitch-lock system.

A rotor blade at rest in a flight position experiences 1 G static droop and 1 G static mass moment. For a semi-rigid rotor, these shears and moments can be reacted by the blade retention/pitch bearing. When the rotor blade is folded, the 1 G static mass moment (which is flatwise) becomes a torsional moment about the pitch bearing degree of freedom. Without a robust pitch lock system, the rotor blade will drop to the ground. The pitch lock allows the torsional moment to be reacted by a force couple between the blade retention/pitch bearing and the pitch lock point.

For an articulated rotor, the 1 G droop moment is reacted by a droop stop. The droop stop is angled to keep a rotor blade elastomeric bearing in compression. When the blade folds, the 1 G static moment becomes a torsional moment (same as semi-rigid) which must be reacted by the pitch lock and the elastomeric blade retention/pitch bearing. Since the bearing is no longer in compression, it cannot carry significant shear load. A centering bearing or centering ring or dual pitch lock is often used to protect the spherical blade retention/pitch bearing. Such pitch lock and droop stop systems often require a substantial structure to assure proper operation.

Furthermore, some other rotor systems such as a servo-flap rotor system may further complicate pitch-lock during blade fold because there may be no direct control link to the rotor blades.

Accordingly, it is desirable to provide a compact rotor blade folding system which protects the blade retention/pitch bearings within a rotor system with a minimum of support structure.

SUMMARY OF THE INVENTION

The rotor blade folding system according to the present invention generally includes a bearing housing which folds relative the rotor hub assembly about a fold axis. Each rotor blade assembly generally includes a rotor blade, a rotor blade spindle, a rotor blade bearing, and a bearing housing which folds relative the rotor hub assembly.

The rotor blade folding system essentially collapses the rotor hub by locating the fold axis in a position which results in a more compact rotor hub assembly. By folding the entire pitch bearing assembly, pitch lock systems are minimized or eliminated as the pitch lock system need only react a blade-feathering moment which is typically three orders of magnitude less than that required of a conventional blade-fold system. That is, since blade fold occurs inboard of the pitch bearing (semi-rigid or articulated), the 1 G droop moment will not produce a torsion about the pitch bearing degree of freedom, and the pitch lock can be a much smaller structure. Folding the blade inboard of the pitch bearing (on a conventional rotor) would require removing the connection between the pitch link and pitch horn. This design provides a novel approach to disengage the pitch control system from the blade for automatic fold.

The rotor blade folding system combines the functions of a sleeve and a fold hinge into two parallel joints. The hinge/sleeve provided by the bearing housing contains both the blade retention/pitch bearings and operates as a structural link between the rotor blade and the rotor hub. The bearing housing is attached to the rotor hub using a set of pins that allow the bearing housing to pivot into the folded position. The rotor blade folding system collapses the hub by using the fold hinge for direct attachment of the bearing housing to the hub.

The present invention therefore provides a compact rotor blade folding system which protects the blade retention/pitch bearings within a rotor system with a minimum of support structure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
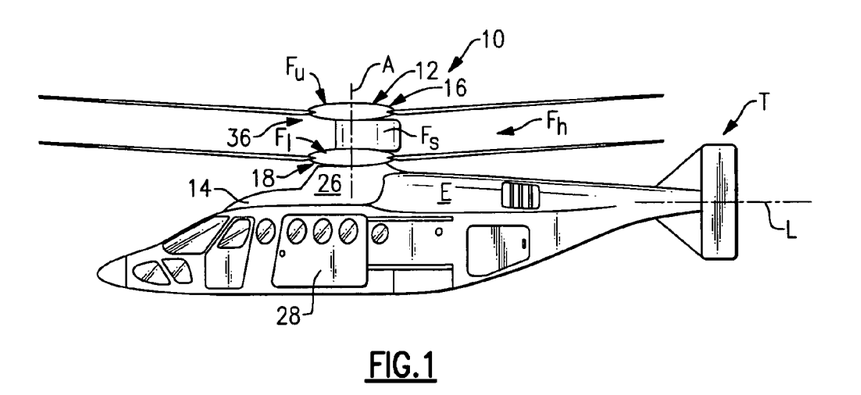
FIG. 1 is a general perspective side view of an exemplary rotary-wing aircraft embodiment for use with the present invention.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems will also benefit from the present invention.

A main gearbox 26 which may be located above the aircraft cabin drives the rotor system 12. The translational thrust system T may be driven by the same main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T.

Figure 2:
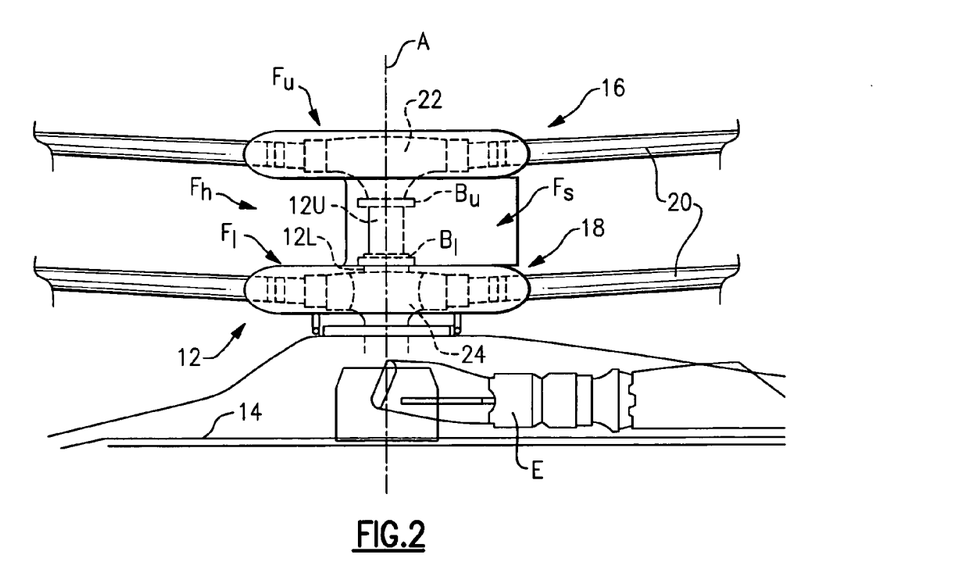
FIG. 2 is an expanded partial phantom view of a dual, counter-rotating, coaxial rotor system of the aircraft of FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about a rotor axis of rotation A. A plurality of the main rotor blade assemblies 20 project radially outward from the hub assemblies 22, 24. Any number of main rotor blade assemblies 20 may be used with the rotor system 12.

The rotor system 12 preferably also includes a rotor hub fairing system Fh generally located between and around the upper and lower rotor systems 16, 18 such that the rotor hub assemblies 22, 24 are at least partially contained therein. The rotor hub fairing system Fh preferably includes an upper hub fairing Fu, a lower hub fairing Fl and a shaft fairing Fs therebetween. The shaft fairing Fs is preferably attached to the counter-rotating, coaxial rotor system 12 through a bearing arrangement Bu, Bl such that the shaft fairing Fs is aligned with the relative wind in forward flight but may be free to pivot during low speed maneuvering. The upper bearing Bu and the lower bearing Bl are respectively located adjacent an upper portion and a lower portion of the shaft fairing Fs. The upper bearing Bu is preferably attached to one rotor shaft 12U while the lower bearing Bl attached to the other rotor shaft 12L such that the bearings counter-rotate and net bearing drag is relatively low.

Figure 3A:
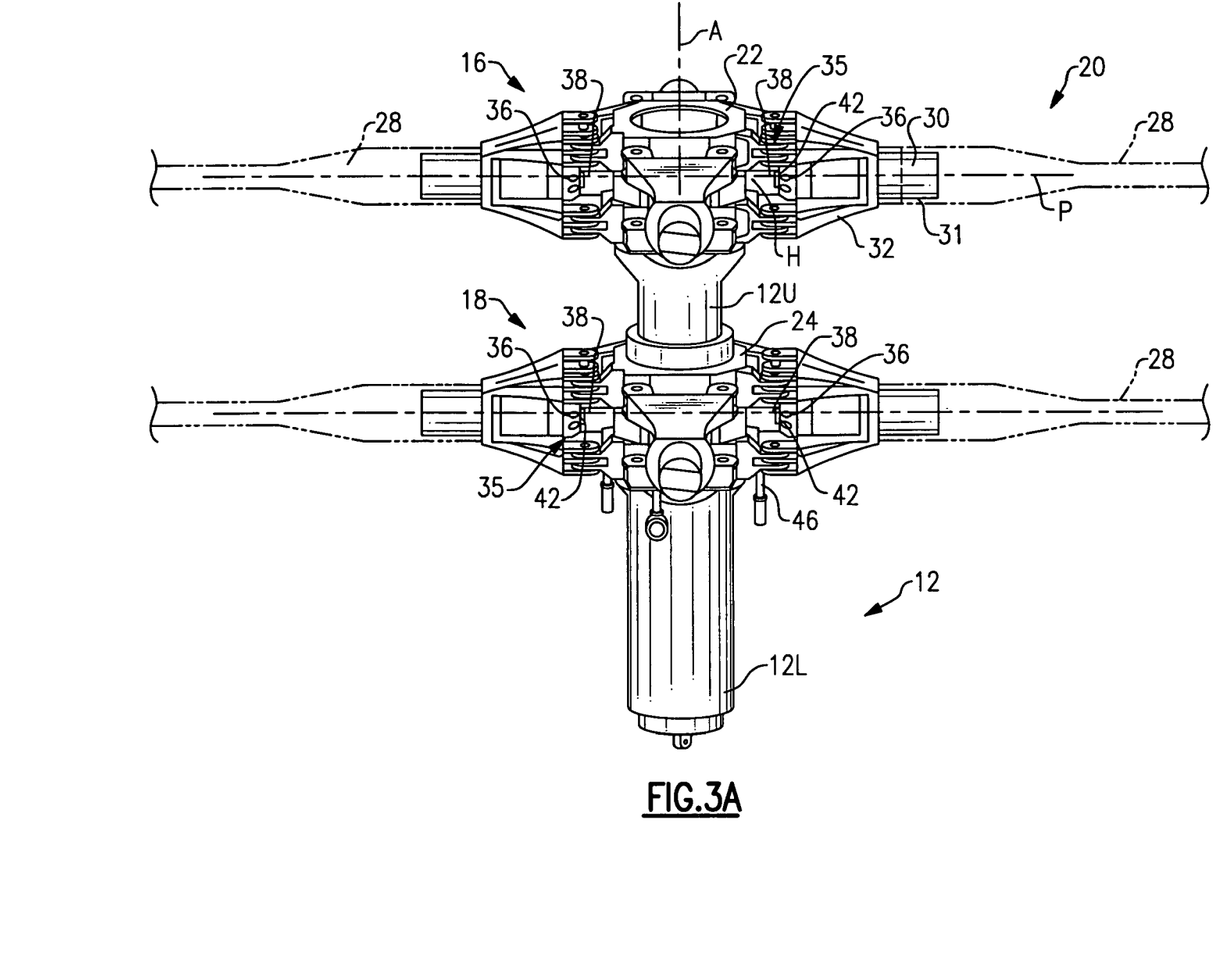
FIG. 3A is a side perspective view of a dual, counter-rotating, coaxial rotor system in a flight position.
Figure 3B:
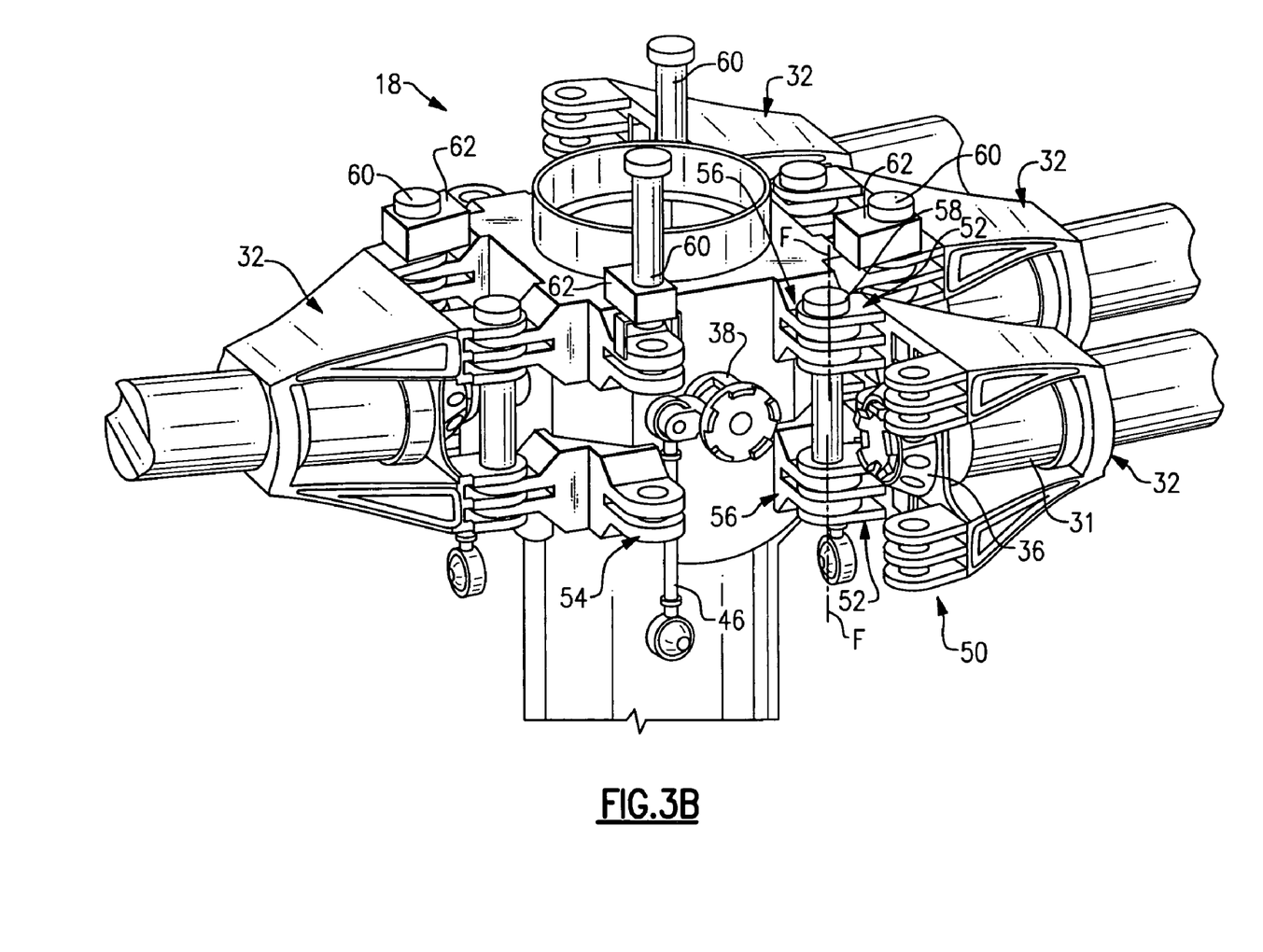
FIG. 3B is a perspective view of a lower rotor hub assembly of the dual, counter-rotating, coaxial rotor system in a folded position.
Figure 3C:
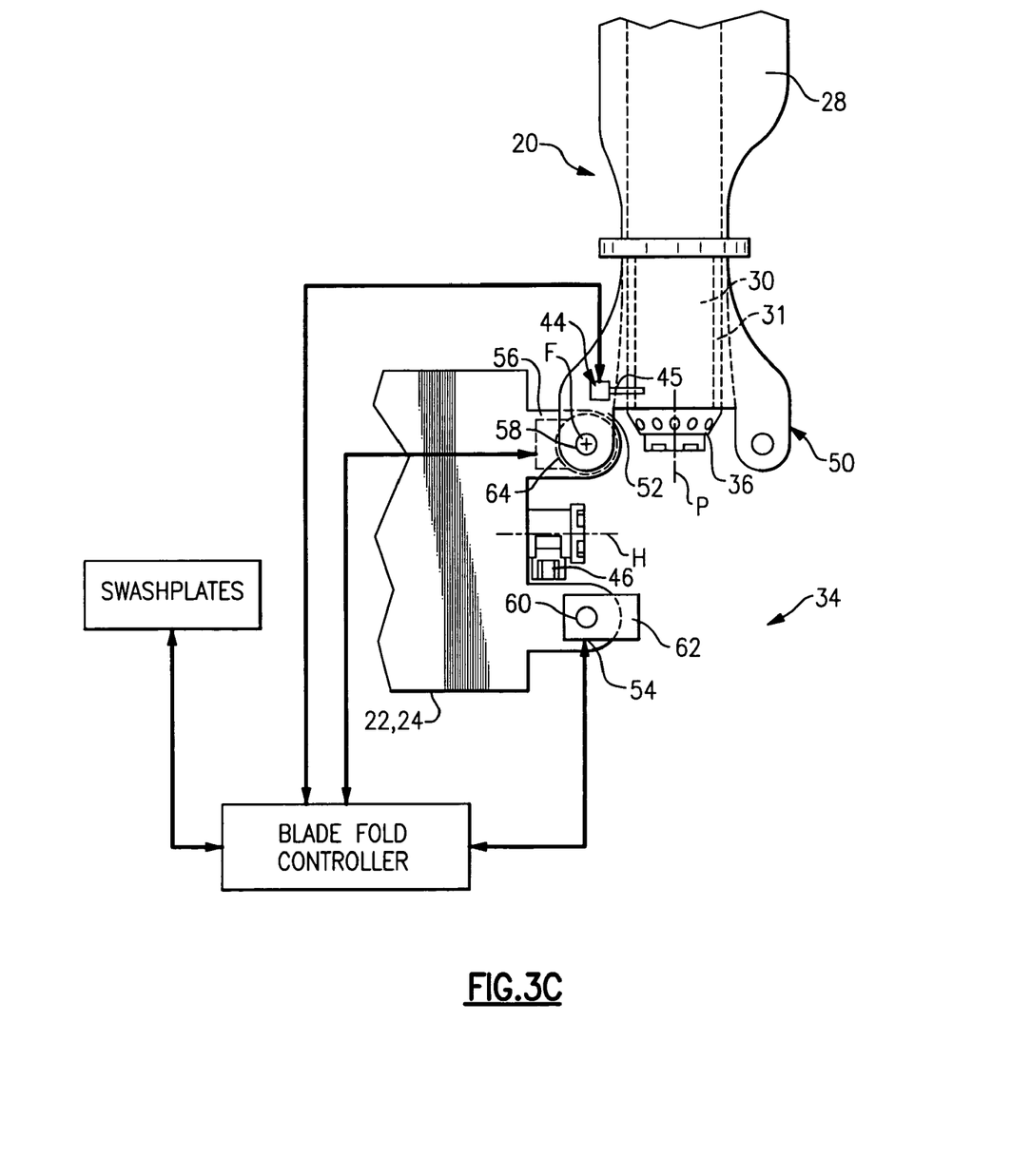
FIG. 3C is a schematic diagram of a blade fold control system.

Referring to FIG. 3A, each rotor blade assembly 20 of the rotor system 12 generally includes a rotor blade 28 (illustrated somewhat schematically), a rotor blade spindle 30, a rotor blade bearing 31 (best seen in FIG. 3C) that supports the rotor blade spindle 30 and a bearing housing 32 which folds relative the rotor hub assembly 22, 24 about a fold axis F in response to a rotor blade folding system 34 (FIG. 3C). This essentially collapses the rotor hub assemblies 22, 24 to facilitate compatibility with an aerodynamic fairing system by locating the fold axis F in a position which results in a more compact rotor hub assembly 22, 24. It should be understood that various pitch lock systems may be minimized or eliminated as described above as the blade bearing which supports the rotor blade spindle 30 are within and fold with the bearing housing 32.

By folding the bearing housing 32 with the blade retention/ pitch bearing as a complete unit, pitch lock systems are minimized or eliminated as the pitch lock system need only react a blade-feathering moment which is about three orders of magnitude less than that of a conventional blade-fold system requirement. That is, since blade fold occurs inboard of the pitch bearing (semi-rigid or articulated), the 1 G droop moment will not produce a torsion about the pitch bearing degree of freedom, and the pitch lock can be a significantly reduced structure. Folding the blade inboard of the pitch bearing on a conventional rotor would disadvantageously require the pitch link from the pitch horn.

Figure 3D:
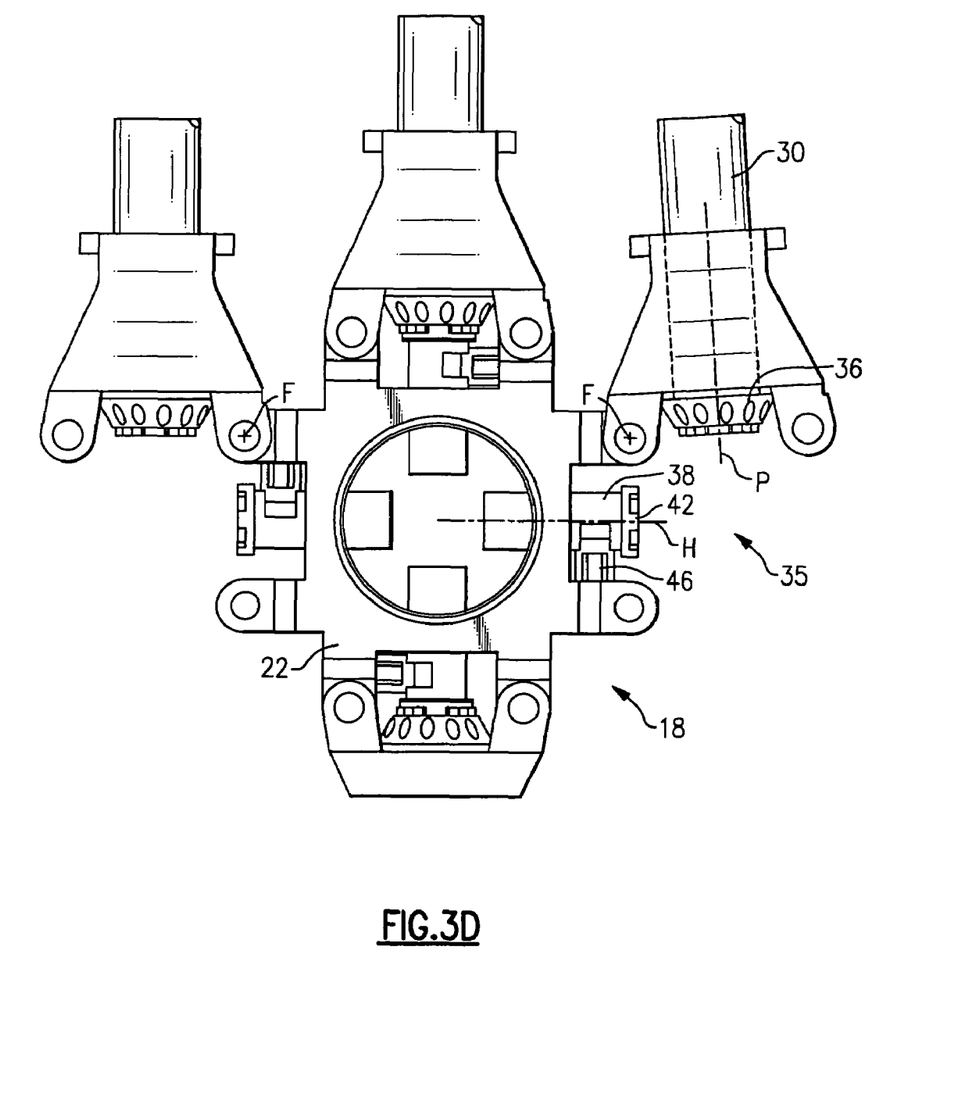
FIG. 3D is a top view of a lower rotor hub assembly of the dual, counter-rotating, coaxial rotor system in a folded position.

A pitch control coupling assembly 35 for each rotor blade assembly 20 includes a blade pitch control coupling 36 mounted for rotation with the rotor blade spindle 30 for rotation about the blade pitch axis P. A horn spindle coupling 38 is rotationally mounted to the rotor hub assembly 22, 24 for rotation about a hub spindle pitch axis H (FIG. 3D). The hub spindle axis H is in-line with the pitch axis P when the bearing housing 32 is in the flight position (FIG. 3A). The blade pitch control coupling 36 rotationally engages the horn spindle coupling 38 at an interface 42 when the bearing housing 32 is in the flight position (FIG. 3A). The interface 42 may be a toothed interface as illustrated or another interface to rotationally lock the blade pitch control coupling 36 with the horn spindle coupling 38 such that a pitch input to the horn spindle coupling 38 is transmitted to the blade pitch control coupling 36, the rotor blade spindle 30 and the attached rotor blade 28.

Referring to FIG. 3B, a pitch control rod 46 for each rotor blade assembly 20 is preferably linked with the horn spindle coupling 38 to impart the desired pitch control thereto. It should be understood that the pitch control rod 46 may be located either internal or external the main rotor shaft of the rotor system 12. Typically, the pitch control rods 46 are external to the main rotor shaft 12L for pitch control of the lower rotor system 18 and internal to the main rotor shaft 12U for pitch control of the upper rotor system 16 (FIG. 3E). It should be understood, that various pitch control rods and links at various locations may be utilized with the present invention.

Each bearing housing 32 includes a first housing lug set 50 and a second housing lug set 52 which correspond to an associated first hub lug set 54 and a second hub lug set 56 fixed to the rotor hub assembly 22, 24 for each bearing housing 32. It should be understood that any number of lugs may be utilized within each set. Preferably, the first housing lug set 50 and the second housing lug set 52 flank the blade pitch control coupling 36 while the first hub lug set 54 and a second hub lug set 56 flank the horn spindle coupling 38. A hinge pin 58 is engaged with the first hub lug set 54 and a second hub lug set 56 to define the fold axis F An axially movable locking pin system 60 selectively engages the first housing lug set 50 and the first hub lug set 54 to lock each bearing housing 32 to the associated rotor hub assembly 22, 24 in the flight position. The axially movable locking pin system 60 is preferably driven by a locking pin drive 62 such as an electric motor or solenoid under control of a blade fold controller C (FIG. 3C).

Referring to FIG. 3C, a fold actuator drive system 64 in communication with the blade fold controller C pivots each bearing housing 32 about fold axis F relative the rotor hub assembly 22, 24 to articulate each bearing housing 32 between the flight and the folded position. The fold actuator drive 64 may include a mechanical, electric motor driven gear set, linear actuator, or other drive system.

A pitch lock system 44 is preferably located within the bearing housing 32 to pitch lock the rotor blade spindle 30 and the attached rotor blade 28 to a predefined pitch position when in the folded position (FIG. 3B). The pitch lock system 44 need only react the blade-feathering moment and may therefore preferably be of a relatively lightweight configuration. The pitch lock system 44 may be a retractable pin 45 or the like (illustrated schematically) to lock the rotor blade spindle 30 to the bearing housing 32. Notably, the pitch control rod 46 will rotationally retain the horn spindle coupling 38 in the predefined pitch fold position when in the folded position. Additionally, the blade fold controller C may articulate the swashplates of the rotor system 12 to position each rotor blade assembly 28 to a particular pitch position prior to folding each of the bearing housings 32 to minimize the aircraft structural envelope when in the folded position.

In operation, the blade fold controller C articulates the swashplates of the rotor system 12 and pitches each rotor blade assembly 20 to the folded position. Once positioned, the blade fold controller C actuates the pitch lock system 44 to drive the pin 45 into engagement with the rotor blade spindle 30 to pitch lock the rotor blade spindle 30 and blade 28 to the bearing housing 32 at the predefined folded pitch position. The blade fold controller C then drives the locking pin drive 62 to retract the locking pin 60 from the first housing lug set 50 and the first hub lug set 54 (FIG. 3B). The blade fold controller C then drives a fold actuator drive 64 to rotate each bearing housing 32 about the fold axis F to position each bearing housing 32 to the folded position relative the rotor hub assembly 22, 24. To unfold the blades, the blade fold controller C reverses these operations.

Figure 4:
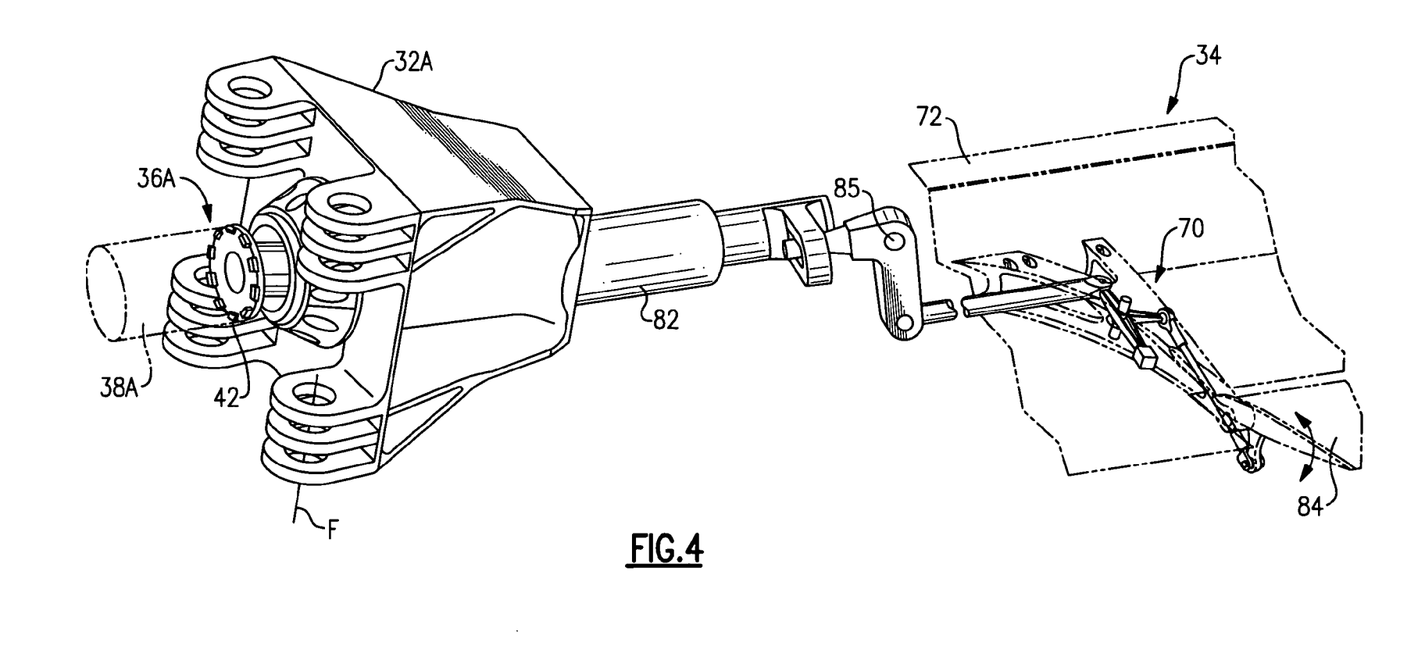
FIG. 4 is a perspective view of a bearing housing for use with a semi-rigid rotor head with a servo-flap control system.

Referring to FIG. 4, another embodiment of the rotor blade folding system 34A is utilized for a semi-rigid rotor system with a servo-flap control system 70. A bearing housing 32A folds relative the rotor hub assembly 22, 24 (FIG. 3C) about a fold axis F defined by the rotor blade folding system 34A as described above. Here, each rotor blade assembly 20A includes a blade pitch control coupling 36A mounted for rotation through a blade spindle 82 to operate a servo-flap 84 (illustrated schematically). The blade pitch control coupling 36A rotationally engages the hub horn spindle coupling 38A at an interface 42 when the bearing housing 32A is in the flight position as generally discussed above. That is, the hub arrangement inboard of the interface 42 is generally similar in each of the disclosed embodiments.

The bearing housing 32A is generally as described above but utilizes the servo-flap control system 70 rather than direct pitching of the rotor blade 28 itself. It should be understood that various pitch lock systems may be minimized or eliminated as described above as the blade retention/pitch bearings fold with the bearing housing 32A. By folding the bearing housing 32A, pitch lock systems are minimized or eliminated as the pitch lock system need only react the blade-feathering moment as described above.

Figure 5A:
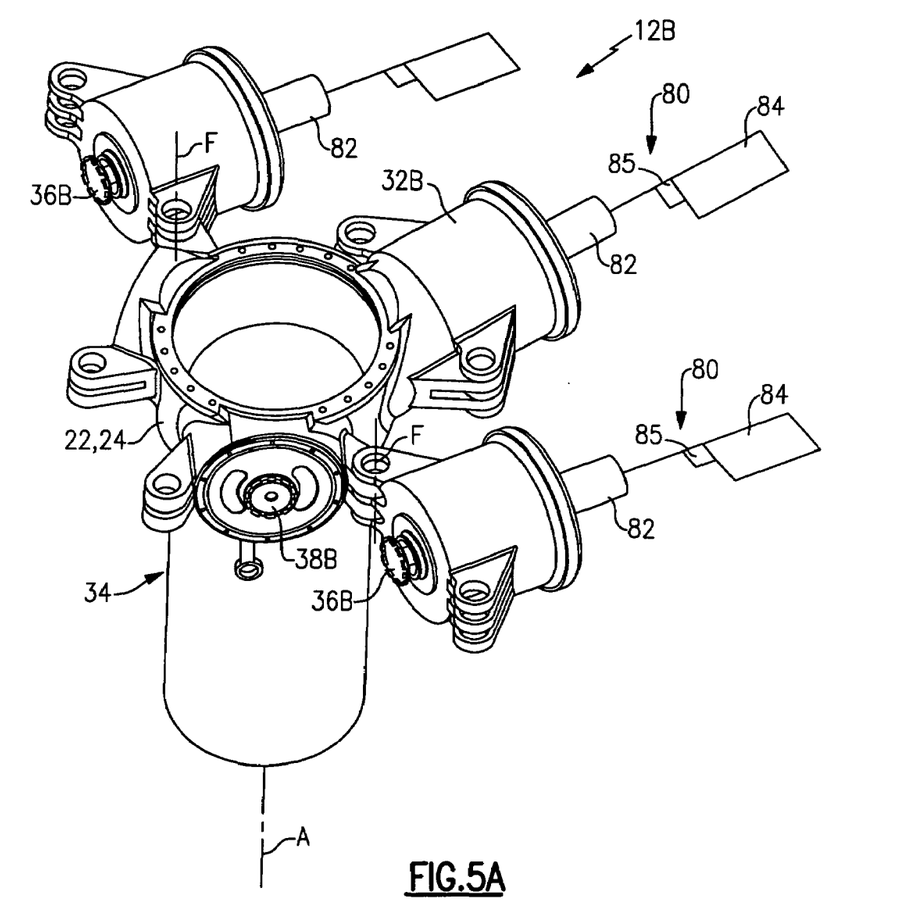
FIG. 5A is a perspective view of a fully articulated rotor head with a servo-flap control system.
Figure 5B:
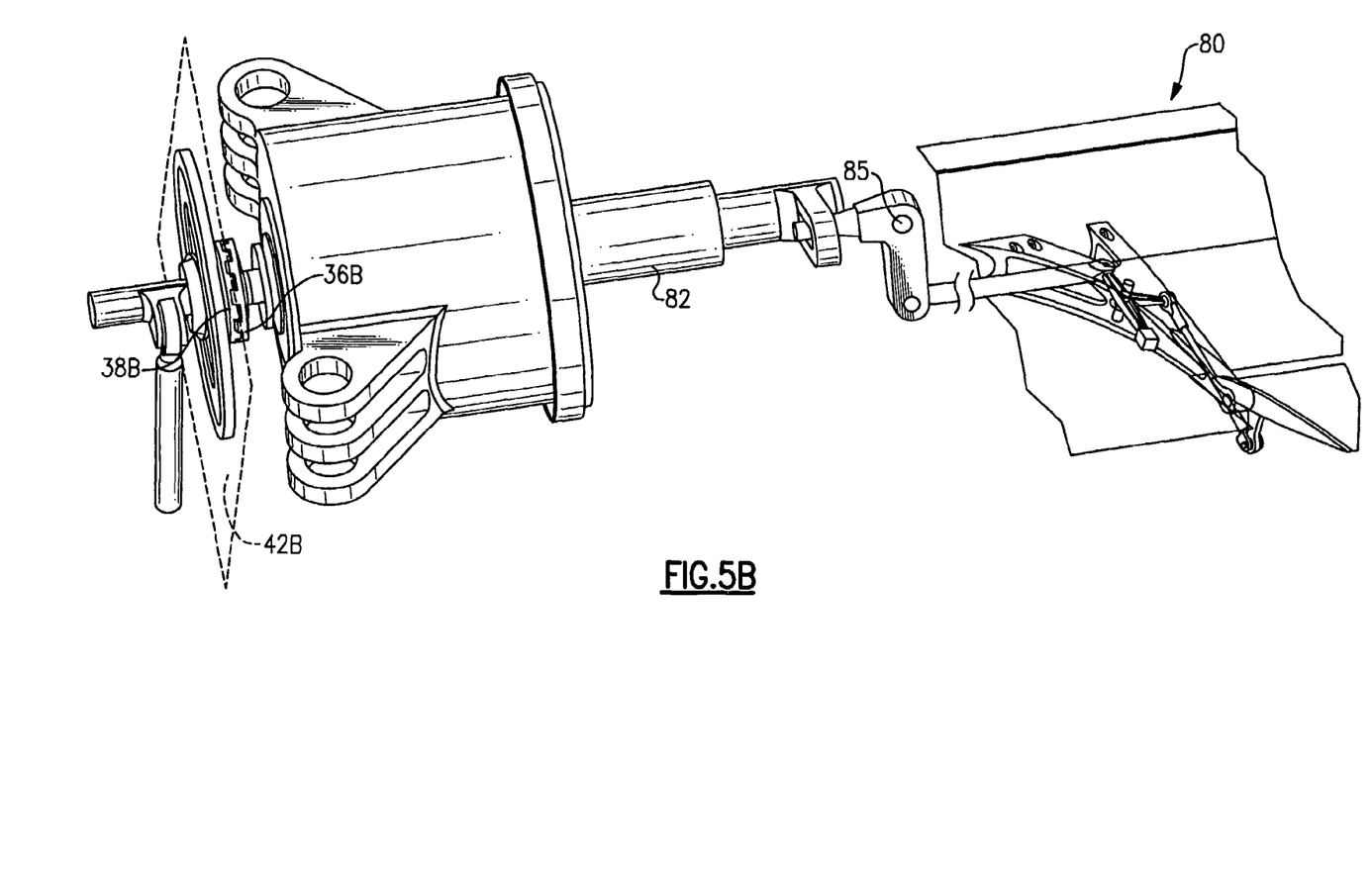
FIG. 5B is a perspective partial phantom view of a bearing housing of the fully articulated rotor head of FIG. 5A.

Referring to FIG. 5A, another embodiment of the rotor blade folding system 34B is utilized for an articulated rotor system with a servo-flap control system 80. A bearing housing 32B folds relative the rotor hub assembly 22, 24 about a fold axis F defined by the rotor blade folding system 34B as described above. Each bearing housing 32B includes a blade pitch control coupling 36B mounted for rotation within a blade retention spindle 82 which operates a servo-flap assembly 84 (also illustrated schematically; FIG. 5B). The torsional motion of the blade control tube 83 within the blade retention spindle 82 is converted into linear motion by a linkage 85 or the like. The blade pitch control coupling 36B rotationally engages the horn spindle coupling 38B at an interface 42B when the bearing housing 32B is in the flight position as generally disclosed above.

Figure 5C:
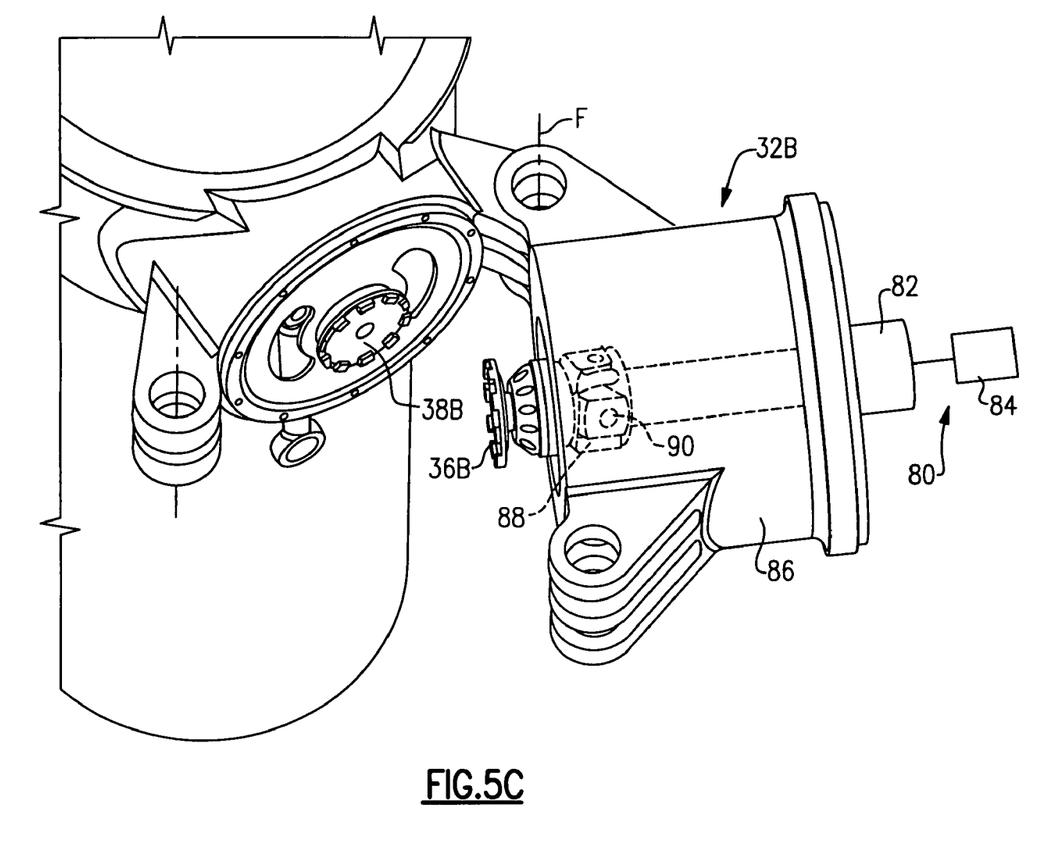
FIG. 5C is an expanded perspective partial phantom view of the bearing housing of FIG. 5A.

Referring to FIG. 5C, the hub arm of this propeller-style bearing hub is preferably split at the focal point of an elastomeric spherical bearing 86 allowing the entire blade retention/pitch bearing assembly within the bearing housing 32B to be folded with the blades. The servo-flap control system 80 is split at the interface 42B of the pitch control coupling assembly 35B. The flapping and lead/lag motions of the blade 28 are decoupled from the pitch control coupling assembly 35B by a U-joint 90 to connect the two segments of the control spindle at the focal point. No centering bearing is required for an articulated rotor system because the elastomeric blade retention/pitch bearing is not significantly loaded during blade fold as the droop stop supports the blade and keeps the bearing in compression during the entire fold cycle. Since the centering bearing is otherwise located at the flap hinge, elimination of it simplifies placement of the universal joint for the servo tab control.

The bearing housing 32B which folds relative the rotor hub assembly 22, 24 supports the elastomeric spherical bearing 86. That is, the elastomeric spherical bearing 86 is located within the bearing housing 32B outboard of the interface 42B. It should be understood that various pitch lock systems may be minimized or eliminated as described above as the elastomeric bearings fold with the blade housing to maintain the blade position relative the bearing housing when in the folded position.

Figure 6:
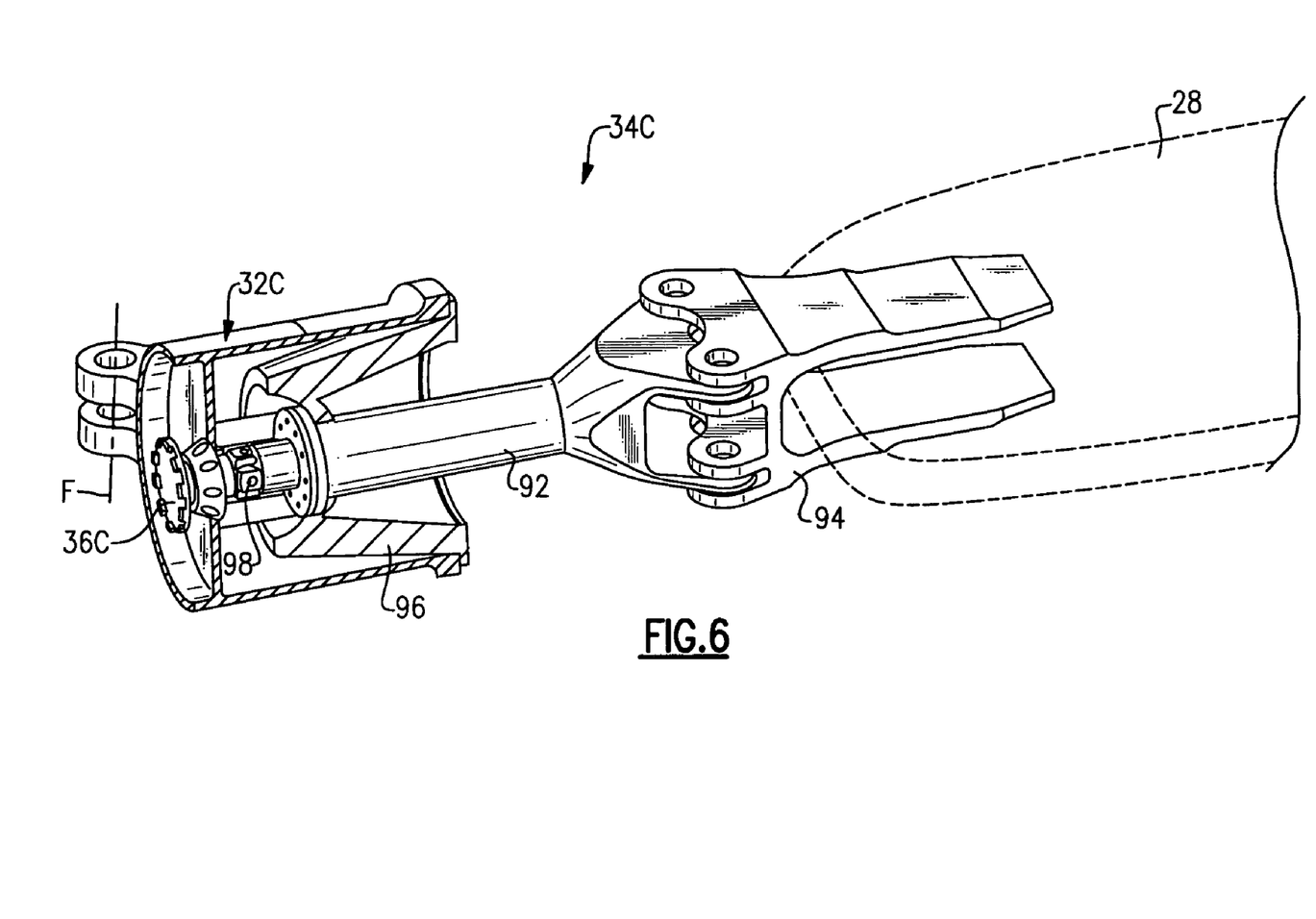
FIG. 6 is a perspective partial longitudinal sectional view of a fully articulated rotor head illustrating an elastomeric bearing arrangement within a bearing housing.

Referring to FIG. 6, another embodiment of the rotor blade folding system 34C includes a fully articulated rotor head with an elastomeric bearing based pitch change mechanism. A bearing housing 32C folds relative the rotor hub assembly 22, 24 (FIG. 3D) about a fold axis F defined by the rotor blade folding system 34C as described above. For this fully articulated rotor head configuration, the in-flight flap and chord moments approach zero as they approach the flap hinge. Locating the flap hinge near the fold hinge reduces the overall size of the fold joint. Here, each rotor blade assembly 20A includes a blade pitch control coupling 36C mounted for rotation of a blade retention spindle assembly 92 mounted to a blade cuff 94 which supports the rotor blade 28 (illustrated schematically). The bearing housing 32C supports an elastomeric spherical bearing 96 which supports the spindle assembly 92. The flapping and lead/lag motions of the blade 28 are decoupled from the pitch control coupling assembly 36C by a U-joint 98 to connect the control spindle assembly 92 at the focal point. It should be understood that various pitch lock systems may be minimized or eliminated as described above.

Generally, the present invention reduces hub drag, locates the fold hinge inboard of the elastomeric bearing to minimize pitch-lock requirements, implements internal servo-flap control system by using a torsion bar and U-joint to increase ballistic tolerance, and facilitates maintenance since the entire blade with bearings and dampers can be removed as a unit.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor blade assembly comprising:
   a rotor blade bearing housing foldable about a fold axis; and
   a rotor blade bearing mounted to said bearing housing which defines a blade pitch axis transverse to said fold axis, said fold axis inboard of said rotor blade bearing.

2. The assembly as recited in claim 1, wherein said bearing housing defines a bearing housing lug which defines said fold axis.

3. The assembly as recited in claim 1, further comprising a rotor blade spindle mounted to said rotor blade bearing, said rotor blade spindle mounted to a rotor blade for rotation about said blade pitch axis.

4. The assembly as recited in claim 3, wherein said bearing housing defines a bearing housing lug opposite said rotor blade spindle.

5. The assembly as recited in claim 3, further comprising a rotor hub mounted horn spindle coupling engageable with a pitch control coupling mounted to said bearing housing for rotation within said rotor blade spindle.

6. The assembly as recited in claim 3, wherein said rotor blade bearing includes an elastomeric bearing contained within said rotor blade bearing housing.

7. The assembly as recited in claim 6, wherein said elastomeric bearing is an elastomeric spherical bearing.

8. A rotor blade assembly comprising:
   a rotor blade bearing housing foldable about a fold axis;
   a rotor blade bearing mounted to said bearing housing which defines a blade pitch axis transverse to said fold axis; and
   a blade pitch control coupling mounted for rotation within a blade retention spindle along said blade pitch axis to operate a servo-flap assembly.

9. The assembly as recited in claim 8, further comprising a joint interspaced within said rotor blade spindle.

10. A rotor hub assembly comprising:
    a rotor hub having a rotor hub lug;
    a rotor blade bearing housing having a bearing housing lug pivotably engaged with said rotor hub lug about a fold axis, said bearing housing foldable relative said rotor hub about said fold axis between a folded position and a flight position; and
    a rotor blade bearing mounted to said bearing housing which defines a blade pitch axis transverse to said fold axis, said fold axis inboard of said bearing.

11. The assembly as recited in claim 10, further comprising a rotor blade spindle mounted to said rotor blade bearing for rotation about said blade pitch axis.

12. The assembly as recited in claim 11, further comprising a second bearing housing lug selectively engageable with a second rotor hub lug.

13. The assembly as recited in claim 12, further comprising a pitch control coupling mounted for rotation with said rotor blade spindle, said pitch control coupling located between said bearing housing lug and said second bearing housing lug.

14. The assembly as recited in claim 10, further comprising a pitch control coupling mounted for rotation with said rotor blade spindle.

15. The assembly as recited in claim 10, further comprising a horn spindle mounted to said rotor hub for rotation about a hub spindle pitch axis, said hub spindle pitch axis in-line with said blade pitch axis when said bearing housing is in said flight position.

16. The assembly as recited in claim 10, further comprising a pitch control rod engaged with said horn spindle to pitch said horn spindle about said hub spindle pitch axis.

17. A method of folding a rotor blade assembly of a rotary wing aircraft rotor hub assembly comprising the steps of:
    (A) mounting an elastomeric bearing assembly within a rotor blade bearing housing to support a rotor blade spindle about a blade pitch axis; and
    (B) folding the rotor blade bearing assembly inboard of the elastomeric bearing assembly relative a rotor hub about a fold axis transverse to the blade pitch axis.

18. A method as recited in claim 17, wherein said step (A) further comprises:
    (a) controlling the pitch of a rotor blade with the rotor blade spindle through a pitch control coupling assembly when the rotor blade bearing assembly is locked in a flight position relative the rotor hub.

19. A method as recited in claim 17, wherein said step (A) further comprises:
    (a) controlling the pitch of a servo-flap control system with the rotor blade spindle through a pitch control coupling assembly when the rotor blade bearing assembly is locked in a flight position relative the rotor hub.

20. A rotor blade assembly comprising:
    a rotor blade bearing housing foldable about a fold axis an elastomeric bearing assembly within said rotor blade bearing housing, said fold axis inboard of said elastomeric bearing assembly.

21. The assembly as recited in claim 20, wherein said elastomeric bearing assembly supports a rotor blade spindle about a blade pitch axis.

22. The assembly as recited in claim 21, wherein said blade pitch axis is transverse to said fold axis.

* * * * *

UNITED STATES PATENT AND TRADEMARK OFFICE
CERTIFICATE OF CORRECTION

| | | |
|---|---|---|
| PATENT NO. | : 7,530,790 B2 | Page 1 of 1 |
| APPLICATION NO. | : 11/524020 | |
| DATED | : May 12, 2009 | |
| INVENTOR(S) | : Cabrera et al. | |

It is certified that error appears in the above-identified patent and that said Letters Patent is hereby corrected as shown below:

Claim 14, Column 8, Line 14: Change "10" to read as --11--

Claim 16, Column 8, Line 22: Change "10" to read as --15--

Signed and Sealed this

Fourth Day of August, 2009

JOHN DOLL
*Acting Director of the United States Patent and Trademark Office*